United States Patent [19]

Nozawa

[11] Patent Number: 4,834,513
[45] Date of Patent: May 30, 1989

[54] ALBADA TYPE ZOOM FINDER

[75] Inventor: Toshihide Nozawa, Tokyo, Japan

[73] Assignee: Olympus Optical Co., Ltd., Tokyo, Japan

[21] Appl. No.: 147,867

[22] Filed: Jan. 25, 1988

[30] Foreign Application Priority Data

Jan. 23, 1987 [JP] Japan ................................. 62-13727
Sep. 10, 1987 [JP] Japan ................................ 62-227061

[51] Int. Cl.$^4$ .......................... G02B 23/14; G02B 9/36
[52] U.S. Cl. .................................... 350/427; 350/432; 354/222
[58] Field of Search ................. 350/427, 432; 354/222

[56] References Cited

U.S. PATENT DOCUMENTS 4,136,939  1/1979  Abe ..................................... 354/222

FOREIGN PATENT DOCUMENTS 61-87122  5/1986  Japan .
61-160712  7/1986  Japan .

Primary Examiner—Bruce Y. Arnold
Assistant Examiner—Rebecca D. Gass
Attorney, Agent, or Firm—Cushman, Darby & Cushman

[57] ABSTRACT

A zoom finder with an Albada System comprising, beginning on the object side, a first lens component having positive refractive power, a second lens component having negative refractive power, a third lens component having negative refractive power and provided with a half mirror on a surface of an image side thereof, and a fourth lens component have positive refractive power and provided with a frame on a surface of an object side thereof, wherein said Albada System is constructed by said third lens component and said fourth lens component; said zoom finder with an Albada System is arranged to be zoomed by moving said second lens component; high magnification, a high magnification ratio, a large angle of view and compact size are provided; and various aberrations are properly corrected. The frame may be provided on the optical member arranged in the vicinity of the fourth lens component on the object side thereof. Further, a field frame may alternatively be provided on the optical member and a focusing frame may also be provided on the surface of the object side of the fourth lens component.

7 Claims, 16 Drawing Sheets

ASTIGMATISM IN
ALBADA SYSTEM

ASTIGMATISM IN
ALBADA SYSTEM

LOW MAGNIFICATION

HIGH MAGNIFICATION

LOW MAGNIFICATION

HIGH MAGNIFICATION

COMA

COMA

SPHERICAL ABERRATION | ASTIGMATISM | DISTORTION

COMA

ASTIGMATISM IN ALBADA SYSTEM

ASTIGMATISM IN ALBADA SYSTEM

COMA

COMA

PUPIL DIAMETER
SPHERICAL ABERRATION
ASTIGMATISM
DISTORTION $\omega = 16.9°$
$\omega' = 9.4°$ $\omega = 28.7°$
$\omega' = 14.2°$

COMA

SPHERICAL ABERRATION

ASTIGMATISM

DISTORTION

COMA

ALBADA TYPE ZOOM FINDER

BACKGROUND OF THE INVENTION (1). Field of the Invention

The present invention relates to a zoom finder, with a compact size and high magnification, having an Albada system.

(2). Description of the Prior Art

Recently, in lens shutter cameras, a lens mechanism provided with a bifocal adjusting position system or a zooming function as a photographing lens has become the object of attention and, with this development, a finder also having a bifocal adjusting position system or a zooming function has been required.

As examples of the finders provided with such functions for varying magnification as mentioned above, lens configurations described in Japanese Patent Preliminary Publication Nos. Sho 61-87122 and Sho 61-160712 are known. The former prior art discloses the lens configuration comprising four components of positive, negative, negative and positive shown in FIG. 1 as an optical system in which compaction has been attained, and the latter teaches the lens configuration including four components of positive, negative, negative and positive as an optical system provided with the Albada system.

The former, however, allows no introduction of the Albada system into the lens configuration of the four components. That is, in the event that the Albada system is introduced into the lens configuration shown in FIG. 1, curvature of field will be largely produced on a surface of an image side of a lens nearest to an image with the fact that a field frame is very difficult to be observed and consequently this lens configuration will have no practical use. In order to solve this problem, it is inevitable that the endmost lens component of the image side is divided into two elements as shown in another embodiment of Japanese Patent Preliminary Publication No. Sho 61-87122 and, as a result, a new problem will arise that the lens configuration is high in cost as compared with that of the four components.

Further, the lens configuration of the four components shown in the prior art of the latter, which attains the introduction of the Albada system, fails to completely reduce its total length, has a magnification ratio as small as 1.5 and forms angles of view as small as 34.0°~23.2°, so that, there is a problem that the lens configuration cannot meet the requirement of a wide angle necessary for the lens shutter camera.

SUMMARY OF THE INVENTION

In view of the above problems, it is a primary object of the present invention to provide an Albada type zoom finder which has high magnification, a high magnification ratio and a large angle of view satisfying fully the requirements of a lens shutter camera for variable power with a simple lens configuration of four lens components and four lens elements and in which the structure is compact and various aberrations are properly corrected.

A lens system according to the present invention, as shown in FIGS. 2, 3A, 3B, and 3C, is the Albada type zoom finder which comprises four lens components and four lens elements including, in the order from an object side, a first lens component of positive, a second lens component of negative moved along an optical axis to vary magnification, a third lens component of negative and a fourth lens component of positive in which the Albada system is constructed by the third and fourth lens components, and is designed to satisfy the following conditions:

$$0.4 < \frac{1}{\sqrt{\beta_W \cdot \beta_T}} \cdot \frac{|R_B|}{R_A} < 1.6 \quad (1)$$

$$1.6 < n_2 \quad (2)$$

where the reference symbol $R_A$ is the radius of curvature of the surface of the object side of the fourth lens component, the reference symbol $R_B$ is the radius of curvature of the surface of the image side of the fourth lens component, the reference symbol $n_2$ is the refractive index relative to the D-lines of the second lens component, the reference symbol $\beta_W$ is the magnification of finder on the low magnification side, and the reference symbol $\beta_T$ is the magnification of finder on the high magnification side.

With respect to the construction described above, the conditions which feature the present invention will be explained below.

Condition (1) is to provide a proper radius of curvature on the surface of the object side of the fourth lens component and correct the curvature of field of an Albada frame system occurring principally in the fourth lens component to thereby realize an easily visible frame of the finder, with correction of various aberrations in the finder system, is to intend the entire lens system for compaction in such a manner that the fourth lens component can be arranged in a position closer to the object, and is to make it possible to increase the magnification and the magnification ratio. The finder system of this type exhibits a strong tendency to correction shortage of spherical aberration with the increase of magnification, so that it is necessary to determine the radius of curvature of this lens surface in accordance with the magnification of finder. If the value of the condition exceeds the lower limit, the curvature of field in the Albada system deteriorates in a positive direction and it is difficult to bring about compaction, high magnification and a high magnification ratio with unfavorable results. Also, if it passes the upper limit, spherical aberration and coma deteriorate to cause likewise unfavorable results.

Condition (2) is to substitute the refractive index for the refracting power of the second lens component which is a variable power lens to thereby make the curvature of the lens surface gentle and correct distortion and astigmatism of the finder system and is to increase the magnification ratio and the angle of view from the fact that the power of the second lens component can be strengthened. If the value of the condition exceeds the lower limit, the curvature of the surface of the second lens component is increased with resultant deterioration of the distortion and astigmatism and it becomes difficult to attain a high magnification ratio and a large angle of view.

Here, in order to further correct properly various aberrations, it is favorable to provide an aspherical surface onto at least one surface of the first lens. The aspherical surface to be provided is desirable to have such shape that its curvature becomes gentle as it separates from the optical axis with respect to spherical shape caused by curvature of apex. Also, the provision of the aspherical surface allows the distortion and astigmatism of the finder system to be more adequately corrected and can contribute effectively towards the increase of the magnification and angle of view of the finder system.

Furthermore, by satisfying the following condition, the compaction and the correction of the curvature of field in the Albada system can be preformed more securely:

$$6 < H_{34} < 10 \qquad (3)$$

where the reference symbol $H_{34}$ is the distance between the principal points of the third lens component and the fourth lens component (unit: mm).

If the value of $H_{34}$ passes the lower limit of the condition, the curvature of field in the Albada system deteriorates in a positive direction to bring about unfavorable results. Also, if it exceeds the upper limit, the total length of the lens system is increased, which is disadvantageous for compact size.

A frame F to be disposed within the Albada system may be evaporated on the surface of the object side of the fourth lens component as illustrated in FIG. 2 or may be provided on an optical member P arranged in close vicinity to the fourth lens component on the object side thereof as shown in FIG. 4. The evaporation of the frame F on the surface of the object side of the fourth lens component enables the visual field system and the Albada system to be constructed by only four lenses and consequently brings about a simple finder. Alternatively, when the frame F is provided on another optical member P, parallax correction in short-distance photographing can be facilitated by the movement of the optical member P in directions transverse to the optical axis as indicated by an arrow in FIG. 4. Further, when, as depicted in FIG. 6, an arrangement is such that only a field frame $F_1$ is provided on the optical member P and a focusing frame $F_2$ is disposed on the surface of the object side of the fourth lens component, the parallax correction can be made without requiring any movement of the optical member P.

Also, in the zoom finder of this type, if only the second lens component is movable, diopter deviation will be generated during the zooming even though the lens system is designed so that the value of the diopter on the high magnification side is identical with that on the low magnification side. Furthermore, considerable deviation of the diopter causes an operator's eye to be much fatigued while the operator looks through the finder to vary the magnification and therefore it brings about unfavorable results. In this instance, as indicated by an arrow in FIG. 2, it is necessary only to move non-linearly the first lens component in a proper extent on the optical axis in accordance with the variation of magnification, thereby maintaining constantly the diopter during the variation of magnification.

This and other objects as well as the features and advantages of the present invention will be apparent from the following description of the preferred embodiments taken in conjunction with the accompanying drawings.

DESCRIPTION OF THE PREFERRED EMBODIMENTS

Preferred embodiments of the Albada type zoom finder according to the present invention which satisfy the abovementioned respective conditions are as shown below.

In these embodiments, aspherical surfaces are individually used for a first lens component and are expressed by the following equation:

$$x = \frac{y^2}{r + \sqrt{r^2 - y^2}} + Ey^4 + Fy^6 + Gy^8$$

where the reference symbol x is the distance measured along the direction of the optical axis from the vertex, the reference symbol y is the distance measured along the direction transverse to the optical axis from the vertex, the reference symbol r is the radius of curvature of the vertex, the reference symbol E is fourth-order aspherical coefficient, the reference symbol F is sixth-order aspherical coefficient, and the reference symbol G is eighth-order coefficient.

Figure 3A:
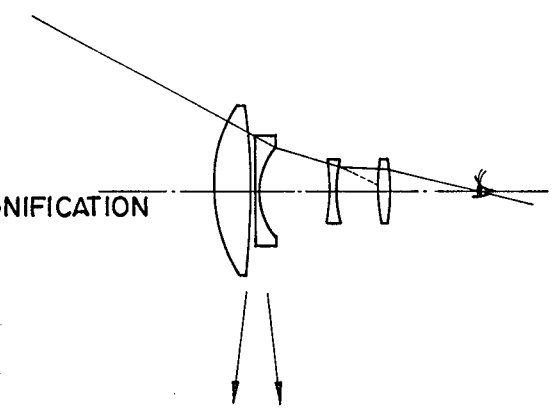
FIGS. 3A, 3B and 3C are views showing a state of the movement of lens components in zooming of the finder shown in FIG. 2.
Figure 3B:
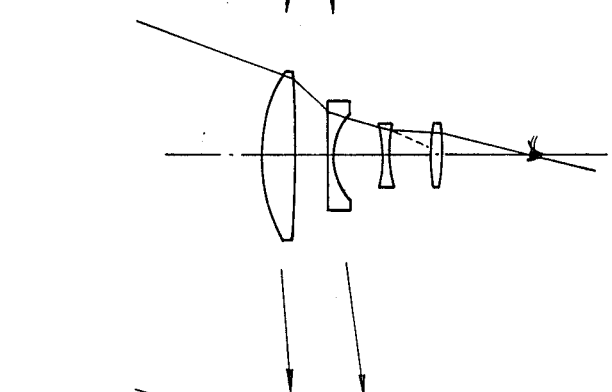
Figure 3C:
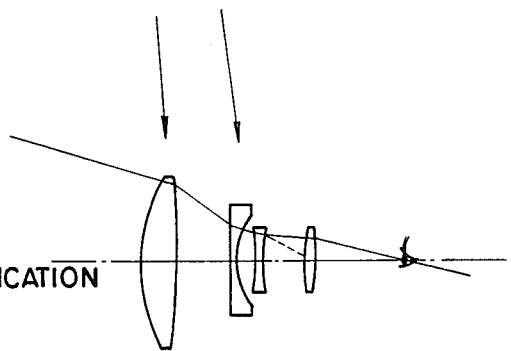
Figure 4:
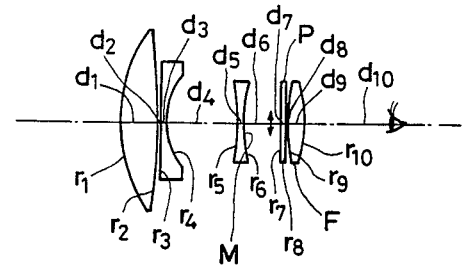
FIG. 4 is a sectional view showing the lens configuration of the Albada type zoom finder with which Embodiment 4 according to the present invention is associated.
Figure 5A:
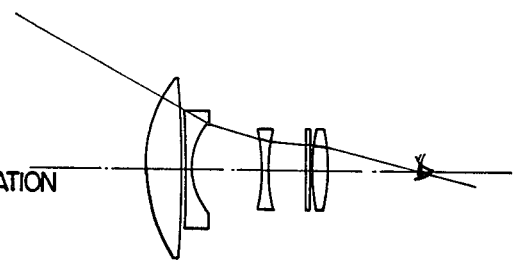
FIGS. 5A, 5B and 5C are views showing a state of the movement of lens components in zooming of the finder shown in FIG. 4.
Figure 5B:
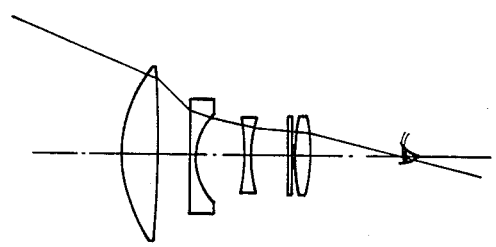
Figure 5C:
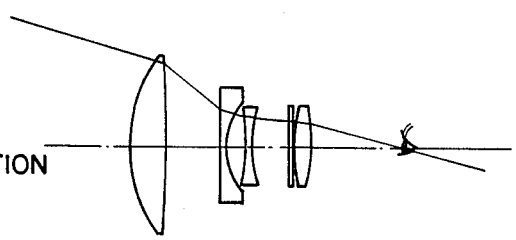

Further, in order to control the deviation of diopter generated in the variation of magnification, each embodiment described below, as shown in FIGS. 3A, 3B and 3C and FIGS. 5A, 5B and 5C, is designed so that the first lens component is moved non-linearly in such a manner that it is in the same position with respect to low magnification and high magnification and is positioned closest to the object in a standard state (i.e. in a state that the magnification of finder becomes $\sqrt{\beta_W \cdot \beta_T}$). Also, the movement of the first lens component stated now should be made as necessary and each embodiment is provided with performance sufficient for practical use even if the first lens component is fixed.

| | Embodiment 1 |
| --- | --- |
| Magnification of finder | 0.46 ($B_W$)~0.82 ($B_T$) |
| | Magnification ratio 1.78 |
| Angle of view (2ω) | 57.8°~31.6° |
| | Total length (maximum) 32.0 mm |

-continued $r_1 = 27.23$
$\quad d_1 = 6.5 \quad n_1 = 1.49216 \quad \nu_1 = 57.50$
$r_2 = -59.87$
(aspherical)
$\quad d_2 = $ variable
$r_3 = -400.00$
$\quad d_3 = 1.0 \quad n_2 = 1.72000 \quad \nu_2 = 43.70$
$r_4 = 11.12$
$\quad d_4 = $ variable
$r_5 = -17.27$
$\quad d_5 = 1.0 \quad n_3 = 1.49216 \quad \nu_3 = 57.50$
$r_6 = 33.50$
$\quad d_6 = 7.8$
$r_7 = 48.90$
$\quad d_7 = 2.0 \quad n_4 = 1.69680 \quad \nu_4 = 55.52$
$r_8 = -24.58$
$\quad d_8 = 15.0$
(to eye point)

Variations of $d_2$ and $d_4$ in zooming

| Magnification | 0.46 | 0.61 | 0.82 |
|---|---|---|---|
| $d_2$ | 0.3 | 5.3 | 9.1 |
| $d_4$ | 12.2 | 8.4 | 3.4 |

$$\frac{1}{\sqrt{\beta_W \cdot \beta_T}} \cdot \frac{|R_B|}{R_A} = 0.82 \quad H_{34} = 9.03$$

Aspherical coefficient $E = 0.143 \times 10^{-4}$
$F = -0.150 \times 10^{-7}$
$G = 0.600 \times 10^{-11}$

Embodiment 2

Magnification of finder $\quad$ 0.50 ($\beta_W$)~0.86 ($\beta_T$)
$\quad$ Magnification ratio 1.72
Angle of view ($2\omega$) $\quad$ 55.0°~31.4°
$\quad$ Total length (maximum) 31.1 mm $r_1 = 26.42$
$\quad d_1 = 6.4 \quad n_1 = 1.49216 \quad \nu_1 = 57.50$
$r_2 = -82.30$
(aspherical)
$\quad d_2 = $ variable
$r_3 = \infty$
$\quad d_3 = 1.0 \quad n_2 = 1.72000 \quad \nu_2 = 50.25$
$r_4 = 11.54$
$\quad d_4 = $ variable
$r_5 = -22.43$
$\quad d_5 = 1.0 \quad n_3 = 1.51633 \quad \nu_3 = 64.15$
$r_6 = 26.40$
$\quad d_6 = 7.0$
$r_7 = 42.40$
$\quad d_7 = 2.0 \quad n_4 = 1.71300 \quad \nu_4 = 53.84$
$r_8 = -26.50$
$\quad d_8 = 15.0$
(to eye point)

Variations of $d_2$ and $d_4$ in zooming

| Magnification | 0.50 | 0.66 | 0.86 |
|---|---|---|---|
| $d_2$ | 0.5 | 5.5 | 9.3 |
| $d_4$ | 12.0 | 8.2 | 3.2 |

$$\frac{1}{\sqrt{\beta_W \cdot \beta_T}} \cdot \frac{|R_B|}{R_A} = 0.95 \quad H_{34} = 8.08$$

Aspherical coefficient $E = 0.110 \times 10^{-4}$
$F = -0.110 \times 10^{-7}$
$G = 0.200 \times 10^{-11}$

Embodiment 3

Magnification of finder $\quad$ 0.55 ($\beta_W$)~0.94 ($\beta_T$)
$\quad$ Magnification ratio 1.71
Angle of view ($2\omega$) $\quad$ 51.6°~29.0°
$\quad$ Total length (maximum) 30.8 mm $r_1 = 23.80$
(aspherical)
$\quad d_1 = 6.2 \quad n_1 = 1.49216 \quad \nu_1 = 57.50$
$r_2 = -186.88$
$\quad d_2 = $ variable
$r_3 = -800.00$
$\quad d_3 = 1.0 \quad n_2 = 1.72916 \quad \nu_2 = 54.68$
$r_4 = 12.27$
$\quad d_4 = $ variable
$r_5 = -46.55$
$\quad d_5 = 1.0 \quad n_3 = 1.49216 \quad \nu_3 = 57.50$
$r_6 = 20.97$
$\quad d_6 = 6.5$
$r_7 = 32.50$
$\quad d_7 = 2.0 \quad n_4 = 1.60311 \quad \nu_4 = 60.70$
$r_8 = -27.27$
$\quad d_8 = 15.0$
(to eye point)

Variations of $d_2$ and $d_4$ in zooming

| Magnification | 0.55 | 0.72 | 0.94 |
|---|---|---|---|
| $d_2$ | 0.8 | 5.9 | 9.8 |
| $d_4$ | 12.1 | 8.2 | 3.1 |

$$\frac{1}{\sqrt{\beta_W \cdot \beta_T}} \cdot \frac{|R_B|}{R_A} = 1.17 \quad H_{34} = 7.39$$

Aspherical coefficient $E = -0.280 \times 10^{-5}$
$F = -0.100 \times 10^{-7}$
$G = -0.260 \times 10^{-10}$

Embodiment 4

Magnification of finder $\quad$ 0.50 ($\beta_W$)~0.87 ($\beta_T$)
$\quad$ Magnification ratio 1.74
Angle of view ($2\omega$) $\quad$ 57.4°~31.8°
$\quad$ Total length (maximum) 32.3 mm $r_1 = 24.28$
$\quad d_1 = 6.4 \quad n_1 = 1.49216 \quad \nu_1 = 57.50$
$r_2 = -106.24$
(aspherical)
$\quad d_2 = $ variable
$r_3 = -468.14$
$\quad d_3 = 1.0 \quad n_2 = 1.72000 \quad \nu_2 = 50.25$
$r_4 = 11.53$
$\quad d_4 = $ variable
$r_5 = -28.33$
$\quad d_5 = 1.0 \quad n_3 = 1.49216 \quad \nu_3 = 57.50$
$r_6 = 24.83$
$\quad d_6 = 6.6$
$r_7 = \infty$
$\quad d_7 = 0.6 \quad n_4 = 1.51633 \quad \nu_4 = 64.15$
$r_8 = \infty$
$\quad d_8 = 0.3$
$r_9 = 40.57$
$\quad d_9 = 2.7 \quad n_5 = 1.62299 \quad \nu_5 = 58.14$
$r_{10} = -24.58$
$\quad d_{10} = 15.0$
(to eye point)

Variations of $d_2$ and $d_4$ in zooming

| Magnification | 0.50 | 0.66 | 0.87 |
|---|---|---|---|
| $d_2$ | 0.5 | 5.5 | 9.3 |
| $d_4$ | 12.0 | 8.2 | 3.2 |

$$\frac{1}{\sqrt{\beta_W \cdot \beta_T}} \cdot \frac{|R_B|}{R_A} = 0.92 \quad H_{34} = 8.66$$

Aspherical coefficient $E = 0.942 \times 10^{-5}$
$F = -0.870 \times 10^{-8}$
$G = 0.274 \times 10^{-11}$ where the reference symbol $r_i$ is a radius of curvature of each surface of lens components or plates arranged in the order from the object side (where the aspherical surface is provided, the reference symbol $r_i$ represents the curvature of apex), the reference symbol $d_i$ is the thickness and air space of each lens component or plate arranged in the order from the object side, the reference symbol $n_i$ is the refractive index relative to the D-lines of each lens component or plate arranged in the order from the object side, the reference symbol $\nu_i$ is the Abbe number of each lens component or plate arranged in the order from the object side, the reference symbol $R_A$ is the radius of curvature of the surface on the object side of the fourth lens component, and the reference symbol $R_B$ is the radius of curvature of the image side surface of the fourth lens component.

Also, in Embodiments 1 through 3, a half mirror M and a frame F are provided on the surfaces indicated by $r_6$ and $r_7$, respectively. Further, in Embodiment 4, the half mirror M is provided on the surface indicated by $r_6$ and the frame F by $r_8$.

Figure 1:
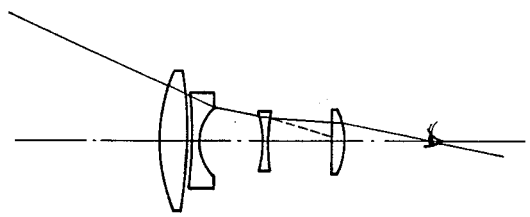
FIG. 1 is a sectional view showing a conventional lens configuration of an Albada type zoom finder.
Figure 6:
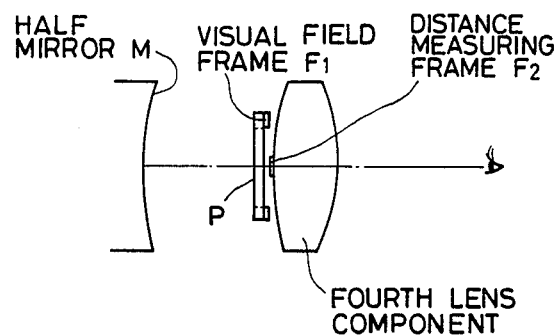
FIG. 6 is an enlarged partial view showing an arrangement example of a frame different from those of FIGS. 2 and 4.
Figure 18:
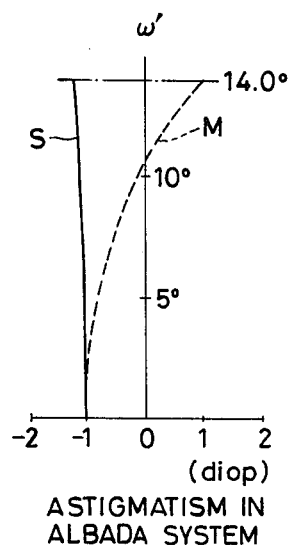
FIGS. 15, 16, 17 and 18 are diagrams showing various aberration curves of Embodiment 3 according to the present invention.
Figure 22:
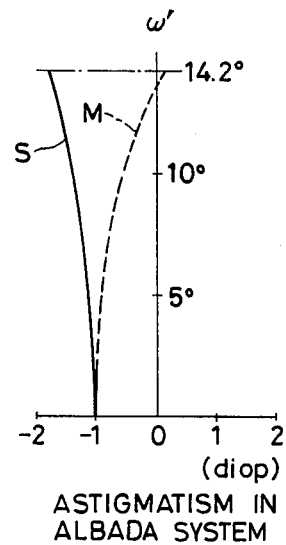
FIGS. 19, 20, 21 and 22 are diagrams showing various aberration curves of Embodiment 4 according to the present invention.
Figure 2:
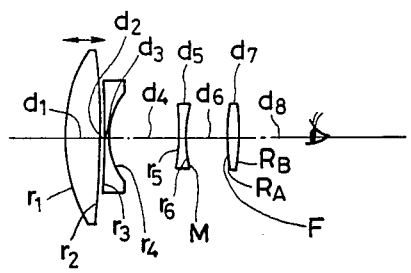
FIG. 2 is a sectional view showing a lens configuration of the Albada type zoom finder with which Embodiments 1 through 3 according to the present invention are associated.
Figure 7:
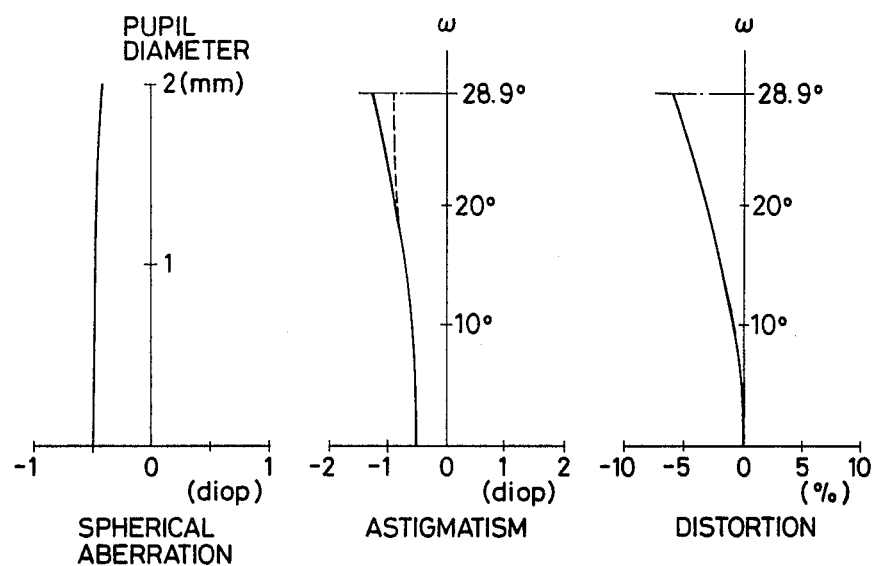
FIGS. 7, 8, 9 and 10 are diagrams showing various aberration curves of Embodiment 1 according to the present invention.
Figure 7:
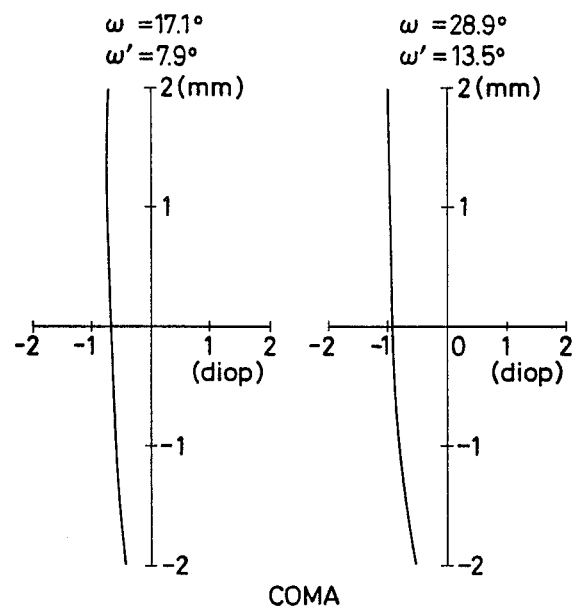
Figure 8:
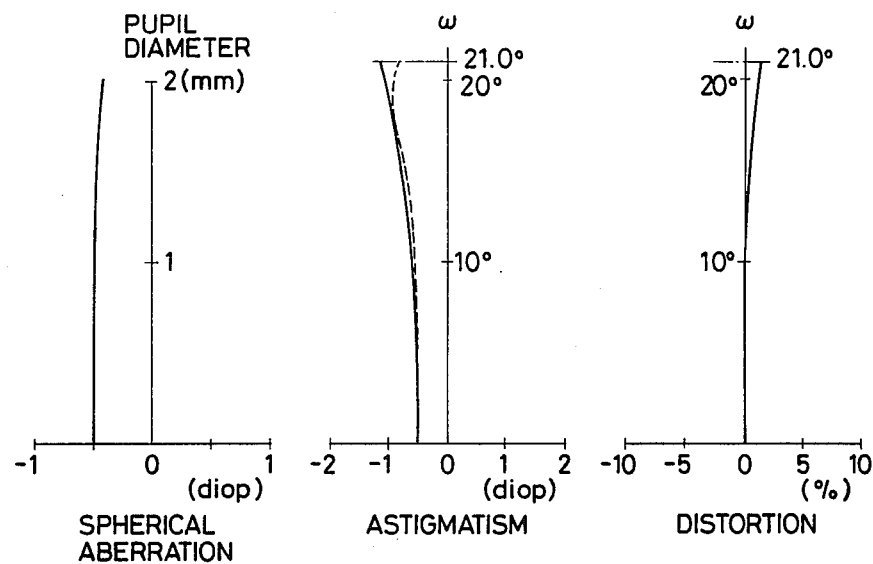
Figure 8:
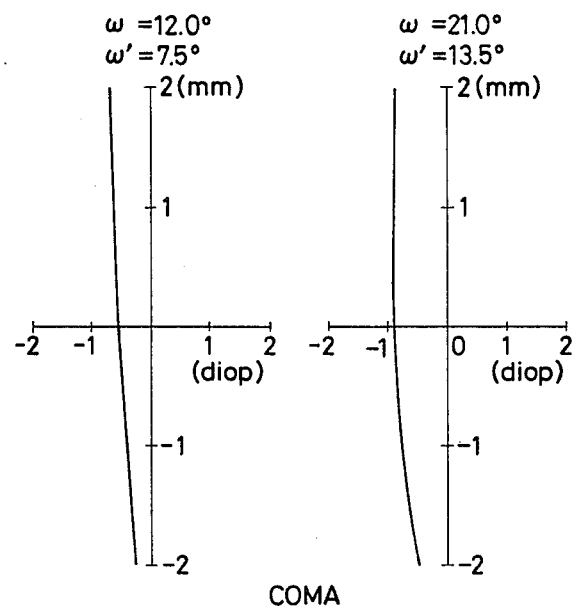
Figure 9:
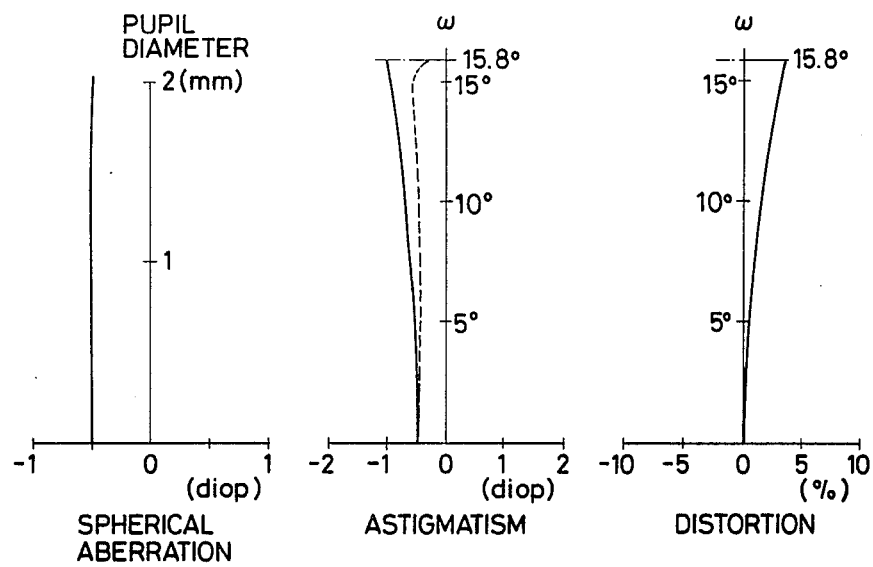
Figure 9:
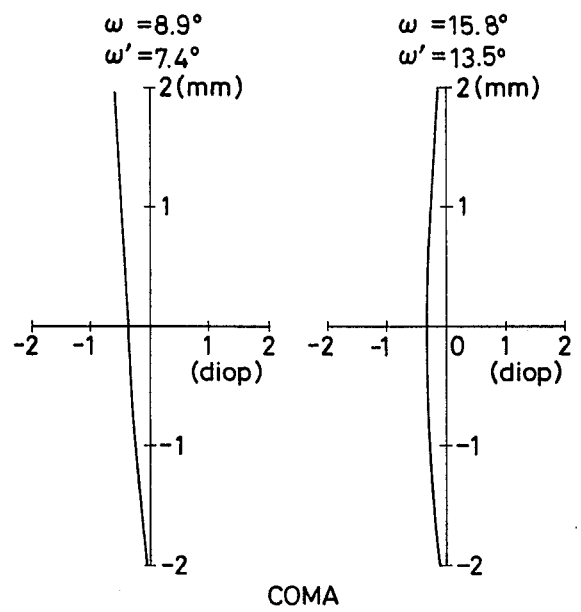
Figure 10:
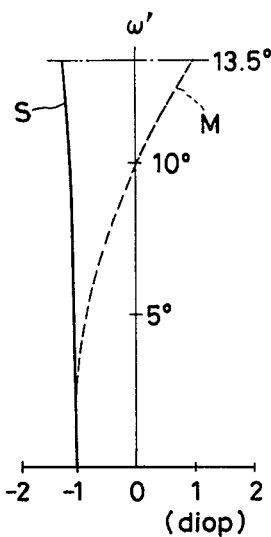
Figure 14:
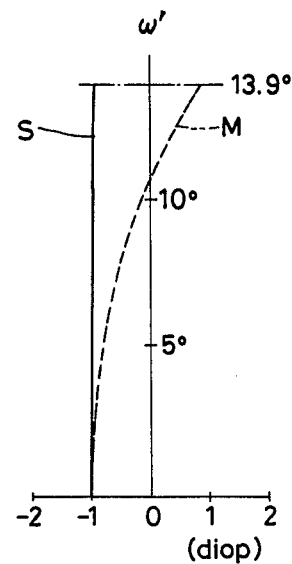
FIGS. 11, 12, 13 and 14 are diagrams showing various aberration curves of Embodiment 2 according to the present invention.
Figure 11:
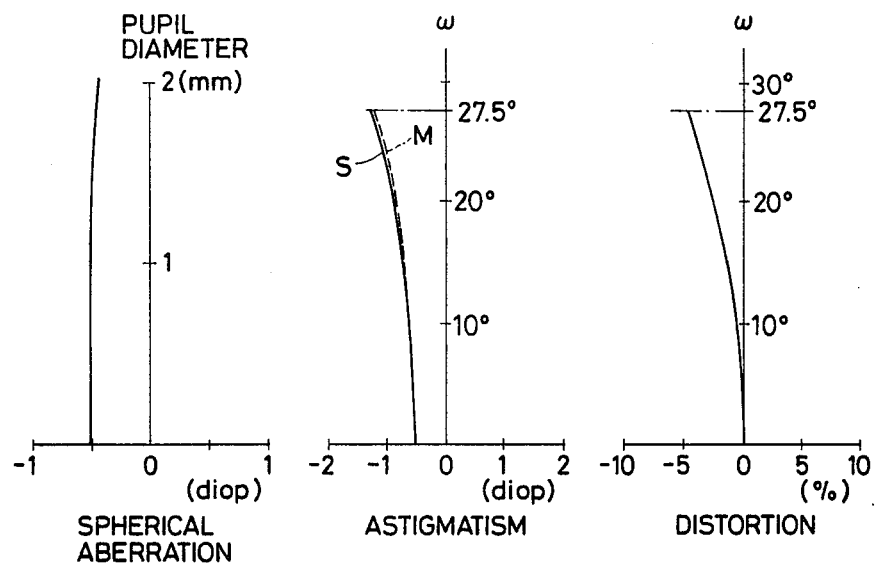
Figure 11:
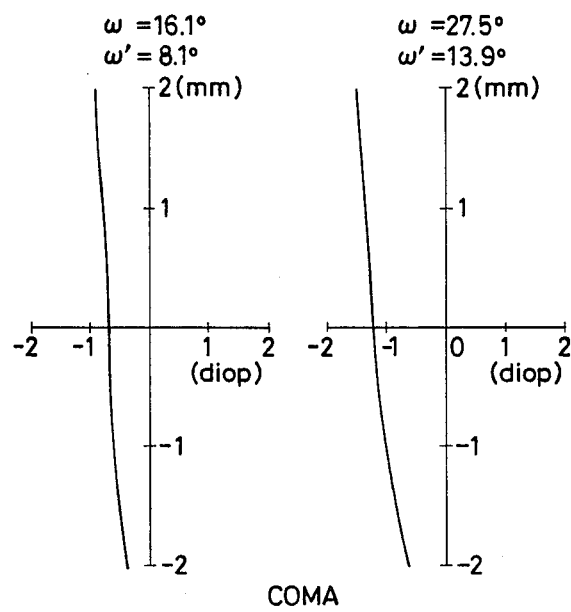
Figure 12:
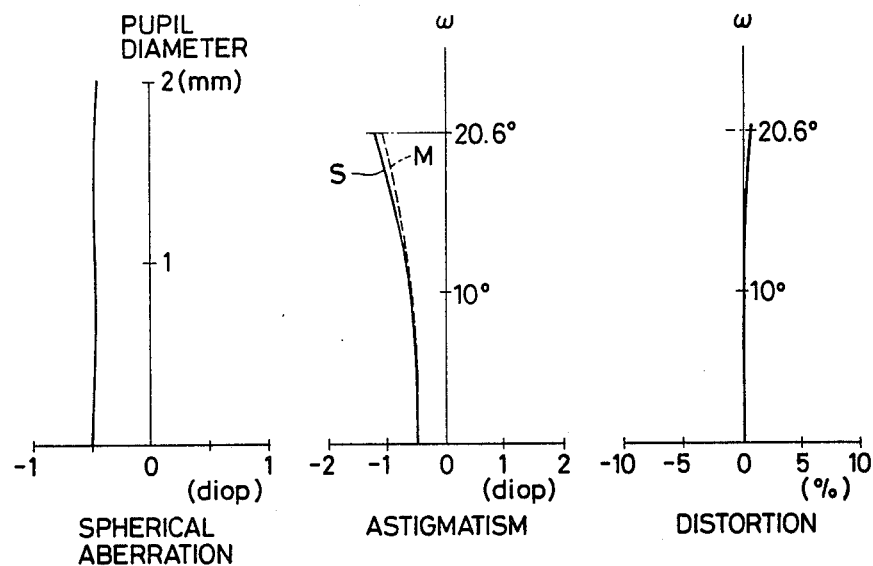
Figure 12:
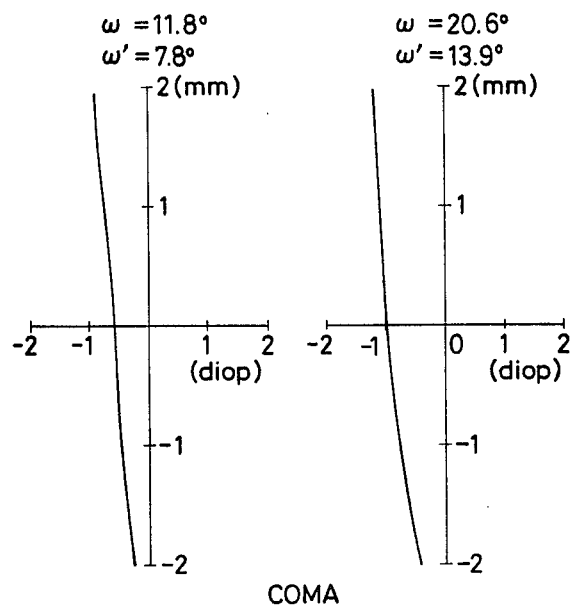
Figure 13:
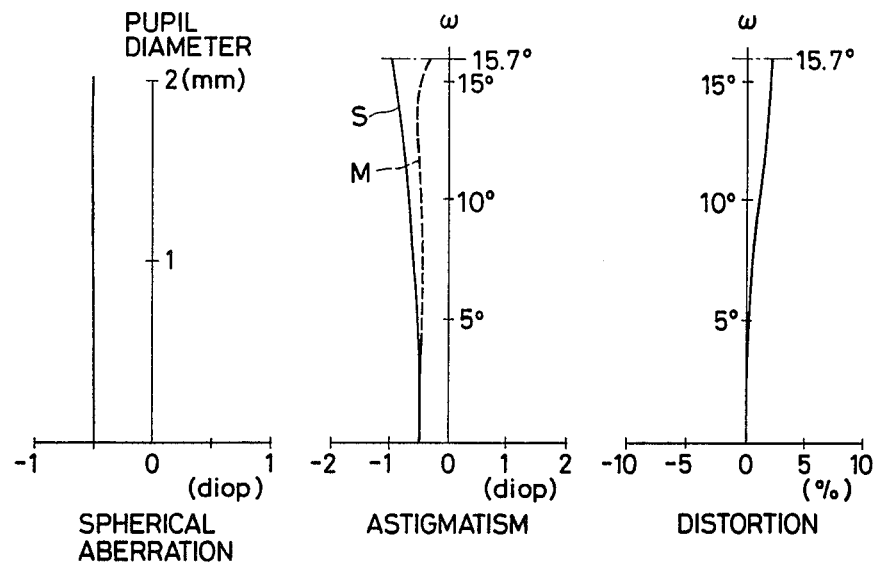
Figure 13:
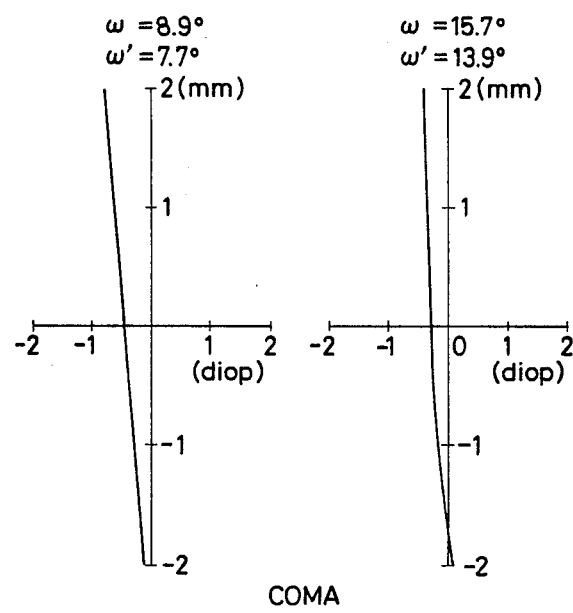
Figure 15:
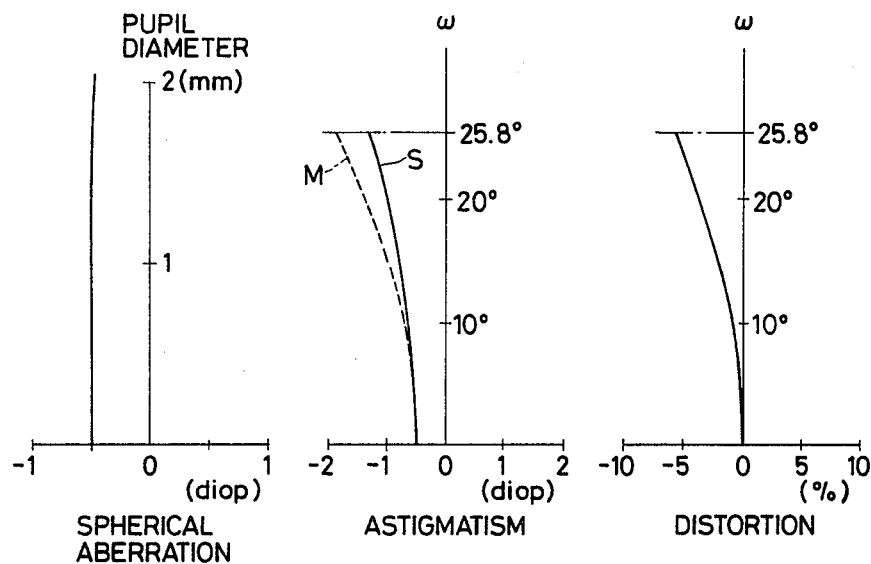
Figure 15:
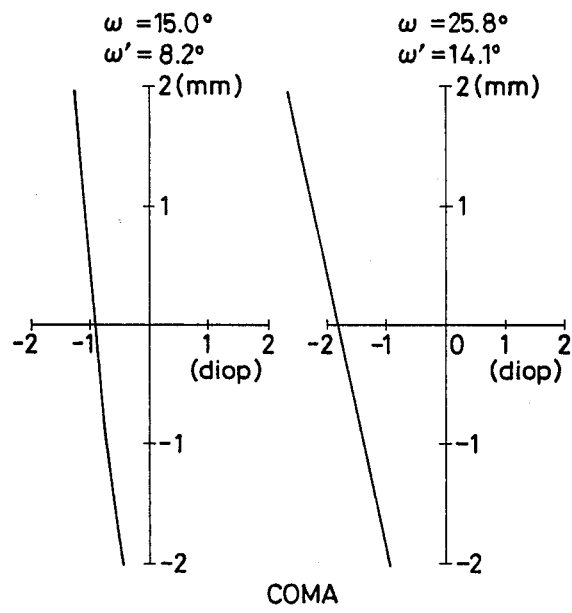
Figure 16:
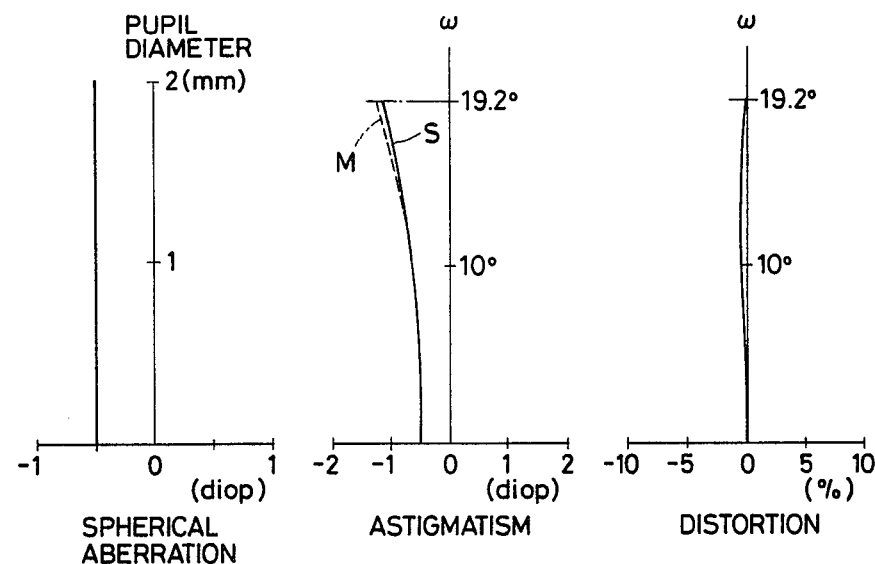
Figure 16:
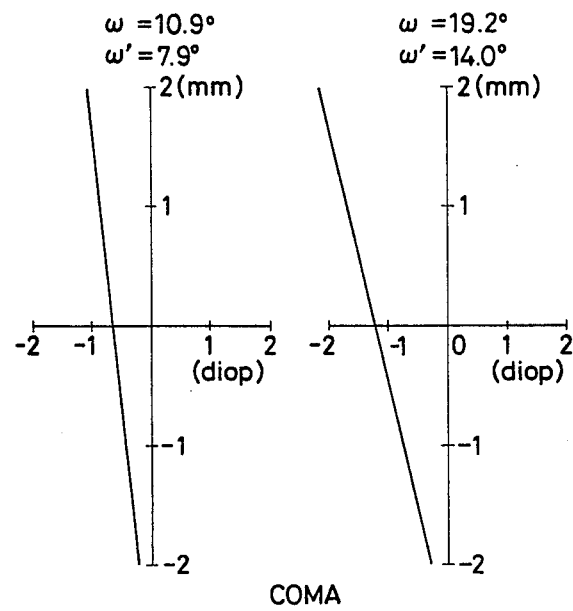
Figure 17:
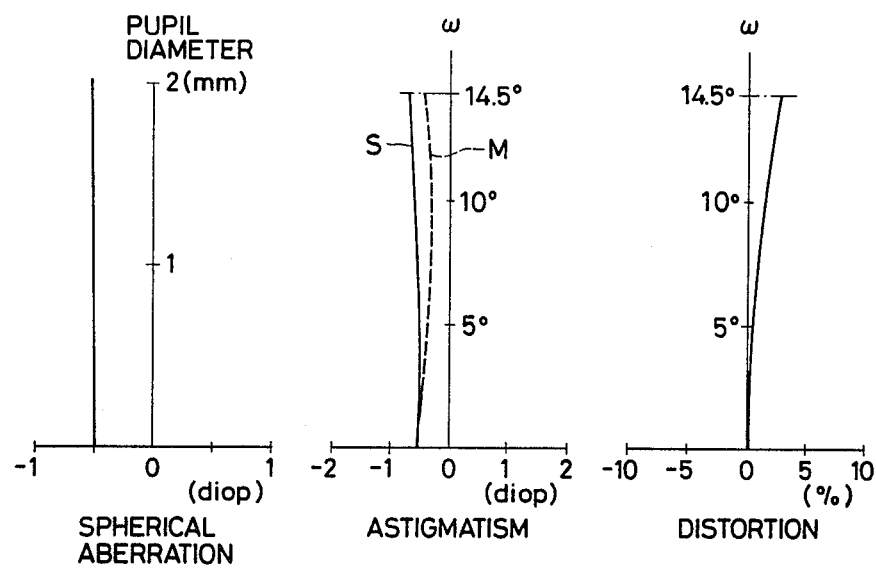
Figure 17:
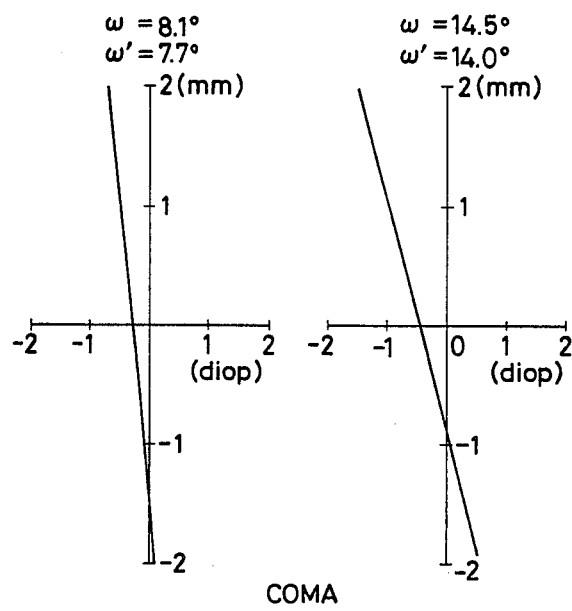
Figure 19:
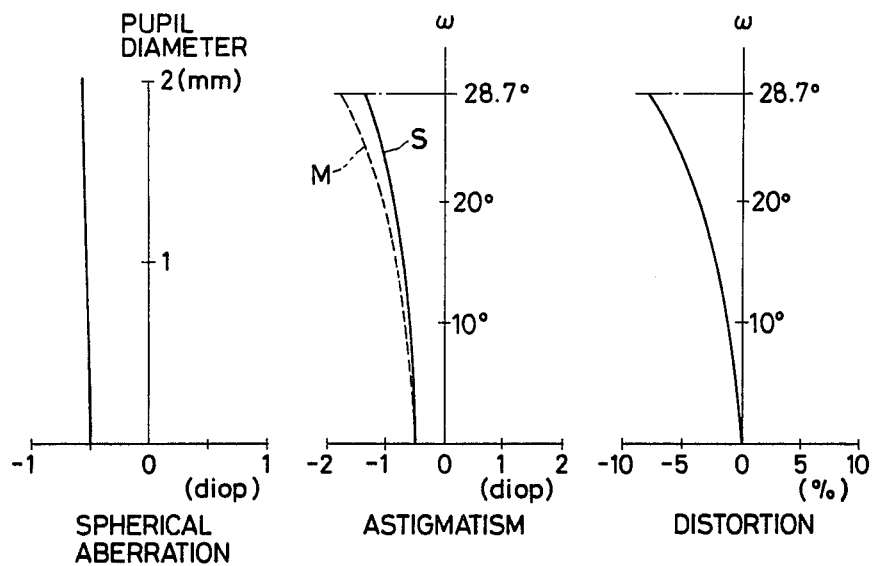
Figure 19:
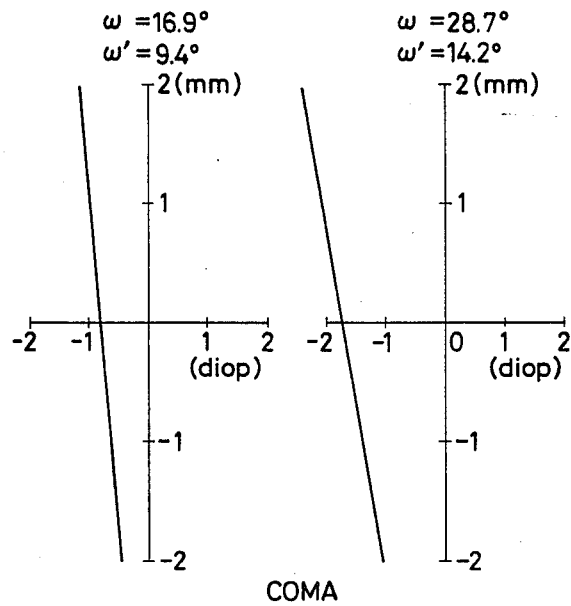
Figure 20:
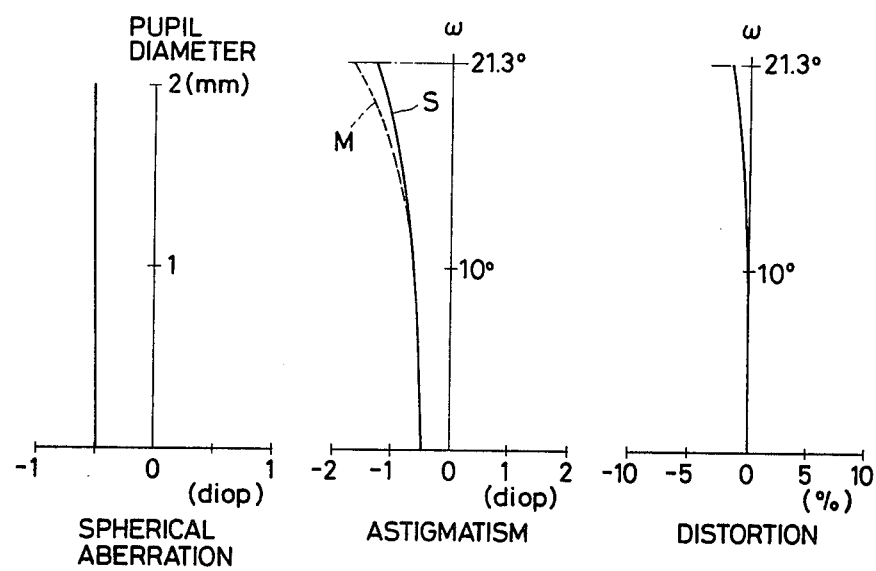
Figure 20:
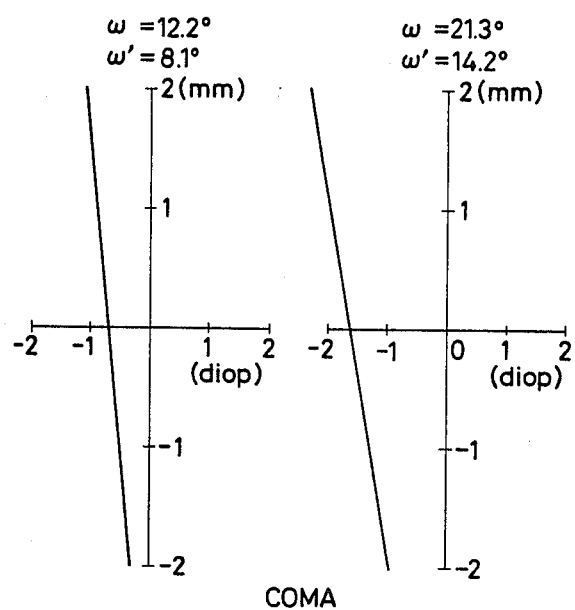
Figure 21:
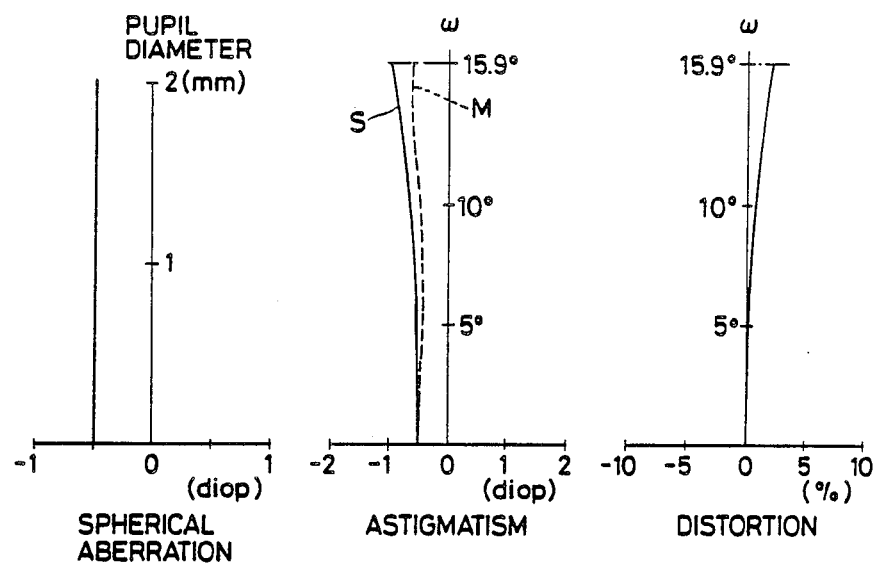
Figure 21:
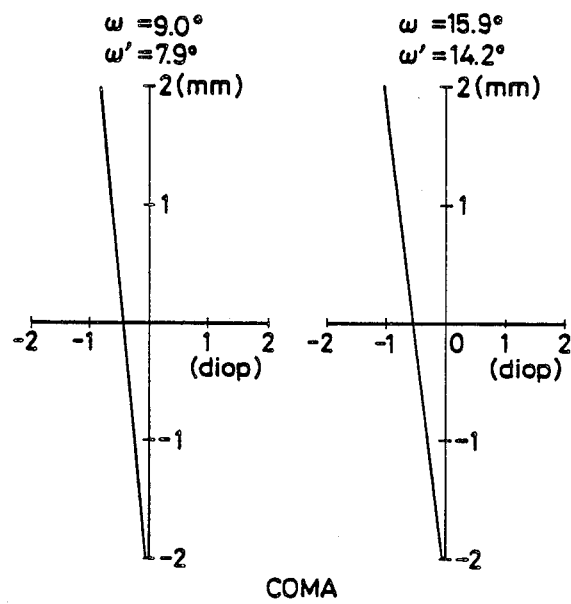

FIGS. 7 through 10, FIGS. 11 through 14, FIGS. 15 through 18, FIGS. 19 through 22 are respective aberration curve diagrams of Embodiments 1 through 4. In these aberration curve diagrams, the reference symbol $\omega$ represents an angle of incidence and $\omega'$ an angle of exit. As will be apparent from the diagrams, various aberrations are properly corrected, together with astigmatism to be generated in the Albada system, and as understood clearly from respective values shown in the embodiments, the Albada type zoom finder can be provided which has high magnification, a high magnification ratio and a large angle of view and which is compact.

What is claimed is:

1. A zoom finder comprising, beginning on an object side, a first lens component having positive refractive power, a second lens component having negative refractive power a third lens component having negative refractive power and a fourth lens component having positive refractive power, wherein said Albada system is constructed by said third lens component and said fourth lens component and said zoom finder with an Albada System is arranged to be zoomed by moving said second lens component, and satisfies the following conditions:

$$0.4 < \frac{1}{\sqrt{\beta_W \cdot \beta_T}} \cdot \frac{|R_B|}{R_A} < 1.6$$

$$1.60 < n_2$$

where the reference symbol $R_A$ is the radius of curvature of a surface of an object side of the fourth lens component, the reference symbol $R_B$ is the radius of curvature of a surface of an image side of the fourth lens component, the reference symbol $n_2$ is the refractive index relative to the D-lines of the second lens component, the reference symbol $\beta_T$ is the magnification of finder on a high magnification side.

2. A zoom finder with an Albada System according to claim 1, wherein one surface of said first lens component includes an aspherical surface having such contour that a middle portion adjacent to the optical axis has spherical shape and its curvature becomes gentle as it separates from the optical axis.

3. A zoom finder with an Albada System according to claim 2, wherein, when a distance between principal points of said third lens component and said fourth lens component is $H_{34}$, the following condition is satisfied:

$$6 \text{ mm} < H_{34} < 10 \text{ mm}.$$

4. A zoom finder with an Albada System according to claim 3, further comprising a frame provided on the surface of the object side of said fourth lens component.

5. A zoom finder with an Albada System according to claim 3, further comprising an optical member arranged in close vicinity to said fourth lens component on the object side of said fourth lens component and provided with a frame thereon.

6. A zoom finder with an Albada System according to claim 3, further comprising an optical member arranged in close vicinity to said fourth lens component on the object side of said fourth lens component and provided with a field frame thereon, wherein a focusing frame is provided on the surface of the object side of said fourth lens component.

7. A zoom finder with an Albada System according to claim 1, wherein said first lens component is moved along the optical axis and is connected with the movement of said second lens component.

* * * * *